(12) United States Patent
Knapschaefer (10) Patent No.: US 9,381,874 B2
(45) Date of Patent: Jul. 5, 2016

(54) LICENSE PLATE HOLDER SYSTEM

(71) Applicant: David Knapschaefer, Dallas, TX (US)

(72) Inventor: David Knapschaefer, Dallas, TX (US)

(73) Assignee: Frontline Frames LLC, Bedford, TX (US)

( * ) Notice: Subject to any disclaimer, the term of this patent is extended or adjusted under 35 U.S.C. 154(b) by 0 days.

(21) Appl. No.: 14/601,779

(22) Filed: Jan. 21, 2015

(65) Prior Publication Data

US 2015/0135568 A1 May 21, 2015

Related U.S. Application Data

(63) Continuation-in-part of application No. 14/022,597, filed on Sep. 10, 2013, now abandoned.

(51) Int. Cl.
*B60R 13/10* (2006.01)
*G09F 7/18* (2006.01)

(52) U.S. Cl.
CPC ............... *B60R 13/105* (2013.01); *G09F 7/18* (2013.01); *G09F 2007/1895* (2013.01)

(58) Field of Classification Search
CPC ....... B60R 13/105; B60R 13/10; G09F 21/04; G09F 7/18
See application file for complete search history.

(56) References Cited

U.S. PATENT DOCUMENTS

| 1,905,874 | A | | 4/1933 | Hudson | |
|---|---|---|---|---|---|
| 2,108,591 | A | | 2/1938 | Marks | |
| 2,797,513 | A | * | 7/1957 | Edwards, Jr. | ........... B60R 13/10 40/209 |
| 3,304,642 | A | | 2/1967 | Dardis | |
| 3,683,529 | A | | 8/1972 | Reed | |
| 4,182,062 | A | * | 1/1980 | Krokos | ................. B60R 13/105 40/209 |
| 4,302,896 | A | * | 12/1981 | Bott | ....... B60R 13/105 40/209 |
| 4,805,331 | A | | 2/1989 | Boggess et al. | |
| 4,891,895 | A | | 1/1990 | DeLaquil, Jr. | |
| 4,924,611 | A | | 5/1990 | Shaw | |
| 5,018,291 | A | | 5/1991 | Pasquale et al. | |
| 5,177,889 | A | | 1/1993 | Hwei | |
| 5,383,294 | A | * | 1/1995 | Shen | ..................... B60R 13/105 40/209 |
| 5,404,664 | A | * | 4/1995 | Brooks | ................. B60R 13/105 40/202 |
| 5,615,501 | A | | 4/1997 | Rice | |
| 5,623,776 | A | | 4/1997 | Lucier | |
| 5,638,623 | A | * | 6/1997 | Shuen | ................... B60R 13/105 40/209 |
| 5,870,841 | A | | 2/1999 | Brody et al. | |
| 5,896,685 | A | * | 4/1999 | McCall | ................. B60R 13/105 40/202 |
| 5,950,339 | A | | 9/1999 | Lucier | |
| 6,213,313 | B1 | | 4/2001 | Levy | |
| 6,243,977 | B1 | | 6/2001 | Shuen | |
| 6,286,238 | B1 | * | 9/2001 | Harrington | ........... B60R 13/105 40/201 |
| 6,478,458 | B2 | | 11/2002 | Hickman | |
| 6,553,695 | B1 | | 4/2003 | Wang | |
| 6,681,507 | B1 | * | 1/2004 | Lieziert | ................... G09F 21/04 40/200 |

(Continued)

FOREIGN PATENT DOCUMENTS

| GB | 2408619 A | 1/2005 |
|---|---|---|
| JP | 2007038700 A | 2/2007 |

*Primary Examiner* — Shin Kim (57) ABSTRACT

A durable, self-locking license plate holder system that allows for the quick and convenient installation and removal of license plates and other identification tags without the use of tools includes a frame having a back plate and an edge extending around the perimeter of the back plate, and an advertising band having at least one tab, the edge having grooves to align the license plate or other identification tag and friction bumps to couple with the tabs to removably secure a license plate between the frame and the advertising band.

9 Claims, 5 Drawing Sheets

(56) References Cited

U.S. PATENT DOCUMENTS

| | | | |
|---|---|---|---|
| D492,633 S * | 7/2004 | Wales | D12/193 |
| 6,796,060 B1 | 9/2004 | Meester | |
| 6,889,458 B2 | 5/2005 | Copley | |
| 6,892,483 B2 * | 5/2005 | Parenti | B60R 13/105 40/201 |
| 7,350,323 B1 | 4/2008 | Basos | |
| 7,607,248 B2 * | 10/2009 | MacNeil | G09F 7/002 40/209 |
| 7,895,778 B2 * | 3/2011 | Jay | G09F 7/00 40/308 |
| 8,028,445 B2 | 10/2011 | Cordell et al. | |
| 8,096,067 B2 * | 1/2012 | Jay | G09F 7/00 40/320 |
| 8,474,167 B2 * | 7/2013 | Bertrand | G09F 7/18 40/600 |
| 8,533,982 B2 | 9/2013 | Rousey et al. | |
| 8,650,780 B2 | 2/2014 | Spencer et al. | |
| 8,938,896 B2 * | 1/2015 | Spencer | A47G 3/00 40/209 |
| 2008/0016730 A1 | 1/2008 | Topitzes et al. | |
| 2012/0210621 A1 | 8/2012 | Huang | |
| 2013/0097900 A1 | 4/2013 | Rousey | |

\* cited by examiner

LICENSE PLATE HOLDER SYSTEM

CROSS-REFERENCE TO RELATED APPLICATION

This application is a continuation-in-part of U.S. Non-Provisional patent application Ser. No. 14/022,597 filed on Sep. 10, 2013, entitled "License Plate Holder System," which is incorporated by reference in its entirety.

TECHNICAL FIELD

The present disclosure relates generally to license plate holder systems, and in particular, to self-locking license plate holder systems that allow for the quick and convenient installation of license plates and other identification tags.

BACKGROUND

State laws require all vehicles to display some type of identification tag or license plate while in operation. This includes vehicles that are being operated for demonstration and evaluation purposes, such as, for example, vehicles that are being test driven by prospective buyers. Moreover, some state laws require different identification tags to be displayed on a vehicle depending on whether the vehicle is being operated by a prospective buyer during a test drive for demonstration and evaluation purposes, the dealer personnel during transit, or the buyer during use prior to receipt of permanent license plates.

Most vehicle dealers typically affix license plate holders to vehicles in their inventory that serve to hold such identification tags and later the buyer's license plate. Such license plate holders also serve to provide advertising for the dealer by displaying the dealer's name and/or logo. While some conventional license plate holders allow for the display of identification tags, most typically require that tools such as screwdrivers be used each time a different identification tag or license plate must be affixed to the vehicle.

Moreover, such conventional license plate holders fail to provide any protection for temporary paper identification tags from the elements, road debris, or during car washes. Typically identification tags are inserted in a plastic cover to provide a small level of protection, however, such covers are flimsy and fail to provide durable protection and often require replacement after a vehicle is sold.

SUMMARY

Embodiments of the present disclosure generally provide self-locking license plate holder systems that allow for the quick and convenient installation and removal of license plates and other identification tags.

Embodiments of the present disclosure generally provide a license plate holder system that may include a frame having a back plate and an edge extending around the perimeter of the back plate, and an advertising band removably attachable along the lower portion of the frame, the advertising band having at least one tab to attach to the frame. The edge may include at least friction bump that disposes against the at least one tab to provide increased traction and removably lock the advertising band to the frame. The edge may also include grooves to elevate a license plate or identification tag. The edge may also include an indention to press and remove the advertising band from the frame. The back plate may include a spacer block that aligns and supports a license plate between the frame and the advertising band. The spacer block may include advertising indicia that may be removably coupled or disposed along the spacer block. The spacer block may be removably coupled to the back plate. The system also may include at least one frame tab disposed along the top portion of the frame that secures a license plate to the frame by having the license plate slide underneath the at least one frame tab to lock into place. The at least one frame tab may comprise two top side frame tabs and a top center frame tab disposed between the two top side frame tabs. The frame also may include at least one port that receives a fastener to secure the back plate to a vehicle.

Embodiments of the present disclosure may further provide a self-locking license plate holding system that may include a frame having an edge extending around the perimeter of the frame and a plurality of tabs disposed along an upper portion of the frame along the edge to receive a license plate, an advertising band removably attachable to a lower portion of the frame along the edge, the advertising band having a first surface and a second surface, at least two tabs extending perpendicularly from the first surface to removably attach the advertising band to the lower portion of the frame, and advertising indicia disposed on the second surface, wherein the license plate is secured between the advertising band and the frame. The edge may include grooves. The frame also may include a spacer block, and advertising indicia may be removably coupled to the spacer block. The edge may also include a manipulation mechanism to allow access to detach the advertising band from the frame. The manipulation mechanism may be an indention, clip, clasp hook and/or plug.

Other embodiments of the present disclosure may provide a license plate holder system that may include a frame coupled to a vehicle, the frame having a back plate and an edge extending around a perimeter of the back plate, a spacer block coupled to the back plate having a first advertising indicia disposed thereto, an advertising band having a first surface and a second surface, an alignment mechanism that aligns a license plate and the advertising band, and a locking mechanism that removably secures the advertising band to the frame. The alignment mechanism may include grooves that are disposed along the edge. The locking mechanism may include a plurality of friction bumps disposed along the edge. The first surface may include a plurality of tabs disposed against the friction bumps further securing the advertising band to the frame.

In an embodiment, the present disclosure provides a self-locking license plate holder system comprising a frame that may be employed to fixedly couple to a vehicle and an advertising band that may be employed to removably secure a license plate or identification tag for display without the use of tools.

In an embodiment, the present disclosure provides a license plate holder system that is easily and conveniently operable by a user, where user simply removes the advertising band from the frame without the use of any tools. The user may then insert, remove or replace a license plate or identification tag within the frame. Finally, the user replaces the advertising band in the frame, thereby locking the license plate holder and securing the license plate or identification tag in place between the frame and the advertising band.

In an embodiment, the present disclosure further provides a multi-functional advertising medium. In an embodiment, when a license plate or identification tag is not required, advertising or other suitable indicia located on the back plate may still be visible. Advertising or other suitable indicia located on the advertising band may be viewable independent of whether or not a license plate or identification tag is present.

In an embodiment, the present disclosure provides a durable license plate holder system which can withstand the elements, road debris, washes and other similar wearing events. Thus, the present disclosure provides a license plate holder system which may be repeatedly used, thereby reducing replacement costs and plastic waste.

Other technical features may be readily apparent to one skilled in the art from the following figures, descriptions and claims.

BRIEF DESCRIPTION OF THE DRAWINGS

For a more complete understanding of the present disclosure and its features, reference is now made to the following description, taken in conjunction with the accompanying drawings, in which.

DETAILED DESCRIPTION

The present disclosure generally provides a durable, self-locking license plate holder system that allows for the quick and convenient installation and removal of license plates and other identification tags without the use of tools.

Figure 1:
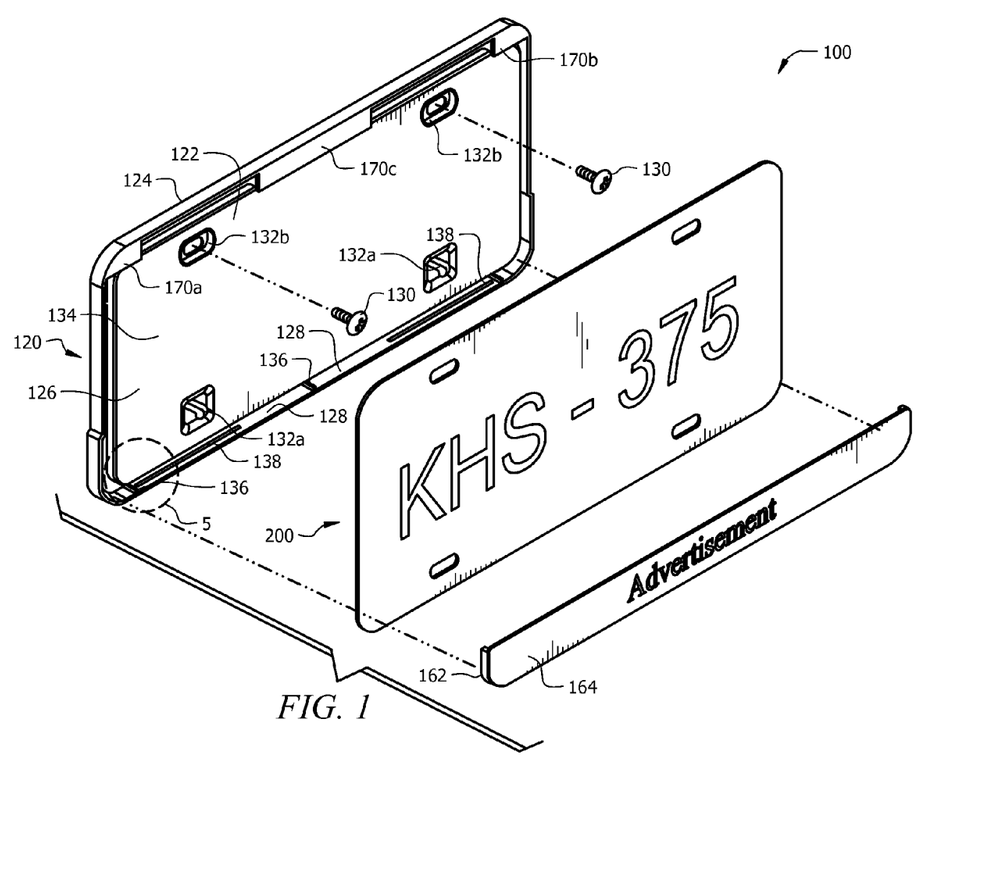
FIG. 1 is an exploded perspective view of a license plate holder system in accordance with one embodiment of the present disclosure.

FIG. 1 generally illustrates license plate holder system 100 according to an embodiment of the present disclosure. System 100 may comprise frame 120 that may be employed to fixedly couple system 100 to a vehicle, and advertising band 164 disposed along the lower portion of frame 120 that may be employed to removably secure license plate or identification tag 200 (referred to herein as "tag 200") for display within system 100. In an embodiment of the present disclosure, advertising band 164 may include tabs 162 on the portion of advertising band 164 abutting frame 120 as depicted in more detail in FIG. 6.

Advertising band 164 may be employed to provide advertising for the dealer, manufacturer or any other suitable product, service, product provider or service provider independent of whether tag 200 is present within system 100. In one embodiment, advertising band 164 may be disposed along the lower portion of frame 120 such that tag 200 may be viewed unobstructedly. Advertising band 164 may provide for interchangeability in advertising without the need to purchase multiple license plate holder systems. Such interchangeability of advertising band 164 may also allow for the display of team spirit, political affiliation, or other suitable non-commercial advertising without departing from the present disclosure.

In an embodiment, frame 120 may generally include back plate 122 having interior surface 126 and edge 124 having inside surface 128 connected thereto. Edge 124 may extend around the entire perimeter of back plate 122.

In an embodiment, back plate 122 may be connected or coupled to a vehicle in any suitable manner that allows frame 120 to be fixedly secured to a vehicle, such as, for example, via screws 130 through ports 132*b*, or any other suitable method including using male and female coupling adapters, a nut and bolt attachment, a ball and socket attachment, a clip or pin attachment, a brass ring and chain attachment, or using other suitable coupling materials, or any combination thereof. In one embodiment, screws smaller than screws 130 may be employed to provide an even more seamless and sleek design. In such embodiment, those smaller screws would fit into smaller ports to provide for a substantially greater water resistant finish. Back plate 122 also may include tabs 132*a* in the lower portion of back plate 122 according to an embodiment of the present disclosure.

In one embodiment, back plate 122 may further comprise spacer block 134 upon which advertising or other indicia may be disposed. Spacer block 134 may display any suitable name, logo, words or phrases. Spacer block 134 may be employed to provide advertising for the dealer, manufacturer or any other suitable product, service, product provider or service provider when tag 200 is not present.

In some embodiments, spacer block 134 may be integrally formed with interior surface 126. In other embodiments, spacer block 134 may be removably coupled or connected to interior surface 126 to create interchangeability in advertising without the need to purchase multiple license plate holder systems. Such interchangeability of spacer block 134 may also allow for the display of team spirit, political affiliation, or other suitable non-commercial advertising without departing from the present disclosure.

Edge 124 may comprise an alignment mechanism, such as grooves 136, coupled or otherwise connected to inside surface 128. It should be understood that system 100 may include any suitable number, size, shape or configuration of alignment mechanisms, such as grooves 136, and such that alignment mechanisms may be disposed in any suitable manner according to one embodiment of the present disclosure.

Spacer block 134 and grooves 136 may be employed to elevate and secure tag 200 in place. In particular, grooves 136 may be employed to align and lift tag 200 to a height so that tag 200 may be displayed and viewed unobstructedly. Spacer block 134 may be employed to provide a backing so as to support tag 200. Spacer block 134 and grooves 136 may further ensure that tag 200 is secure so as to prevent any movement or rattling of tag 200 while the vehicle is in operation or at rest.

Edge 124 may further comprise a locking mechanism, such as friction bumps 138, coupled or otherwise connected to inside surface 128. It should be understood that system 100 may include any suitable number, size, shape or configuration of locking mechanisms, such as friction bumps 138, and that such locking mechanisms may be disposed in any suitable manner according to one embodiment of the present disclosure. Friction bumps 138 may be employed to removably secure tag 200 and lock system 100 in place.

In one embodiment, tabs 162 may be employed to further secure system 100 in place with respect to advertising band 164. It should be understood that system 100 may include any suitable number, size, shape or configuration of tabs 162 and that tabs 162 may be aligned in any suitable manner without departing from the present disclosure.

It also may be appreciated that there may be tabs 170 on front and top of frame 120. Tab 170c may be an overhang that secures the top of system 100 by having the top of frame 120 slide underneath tabs 170a, 170b to hold it in place within system 100 according to an embodiment of the present disclosure.

In one embodiment, frame 120 may include a manipulation mechanism which may be employed to allow a user to access system 100 to insert, remove or replace tag 200 by allowing the user to easily remove advertising band 164 and/or tag 200 from within frame 120.

In some embodiments of the present disclosure, it should be appreciated that the left and right sides of frame 120 may be tapered. This may help to secure and correctly space a license plate, tag or other item against frame 120 according to embodiments of the present disclosure.

It should be understood that system 100 may include any suitable number, size, shape or configuration of manipulation mechanisms, such as indentions 140, and that the manipulation mechanisms may be aligned in any suitable manner without departing from the present disclosure. For example, in one embodiment, indention 140 may have an angled surface that creates a valley in frame 120, as shown in FIGS. 1-4. This configuration may allow a user to easily access the edge of advertising band 164 and pull the edge of advertising band 164 to remove advertising band 164 from frame 120.

In other embodiments of the present disclosure, a clip, clasp, plug, hook, other suitable manipulation mechanisms or a combination thereof may be employed to allow for the removable installation of tag 200 without the use of tools.

Figure 2:
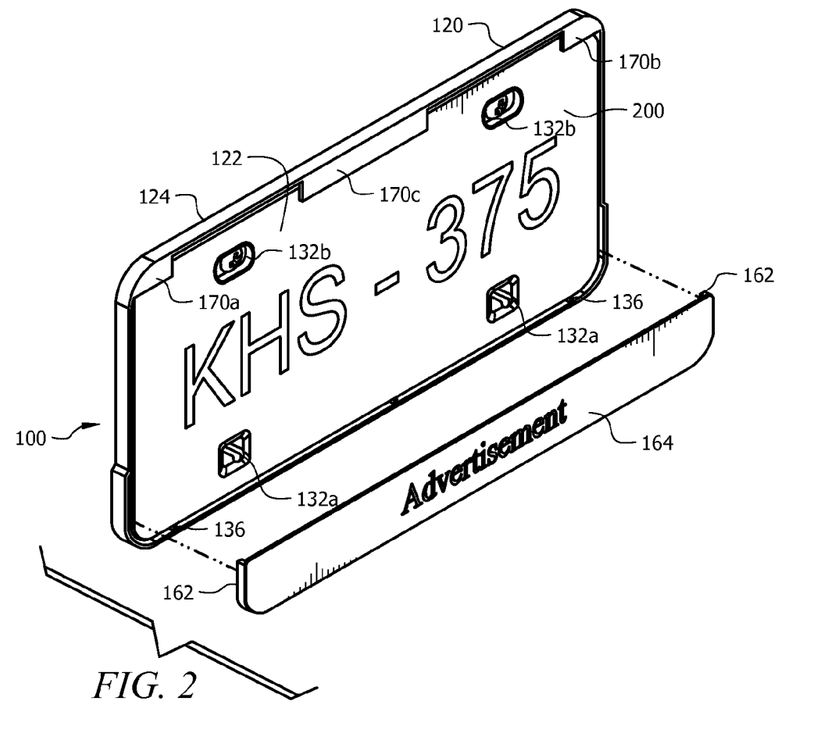
FIG. 2 is a partially exploded perspective view of the license plate holder system of FIG. 1 in accordance with one embodiment of the present disclosure.
Figure 6:
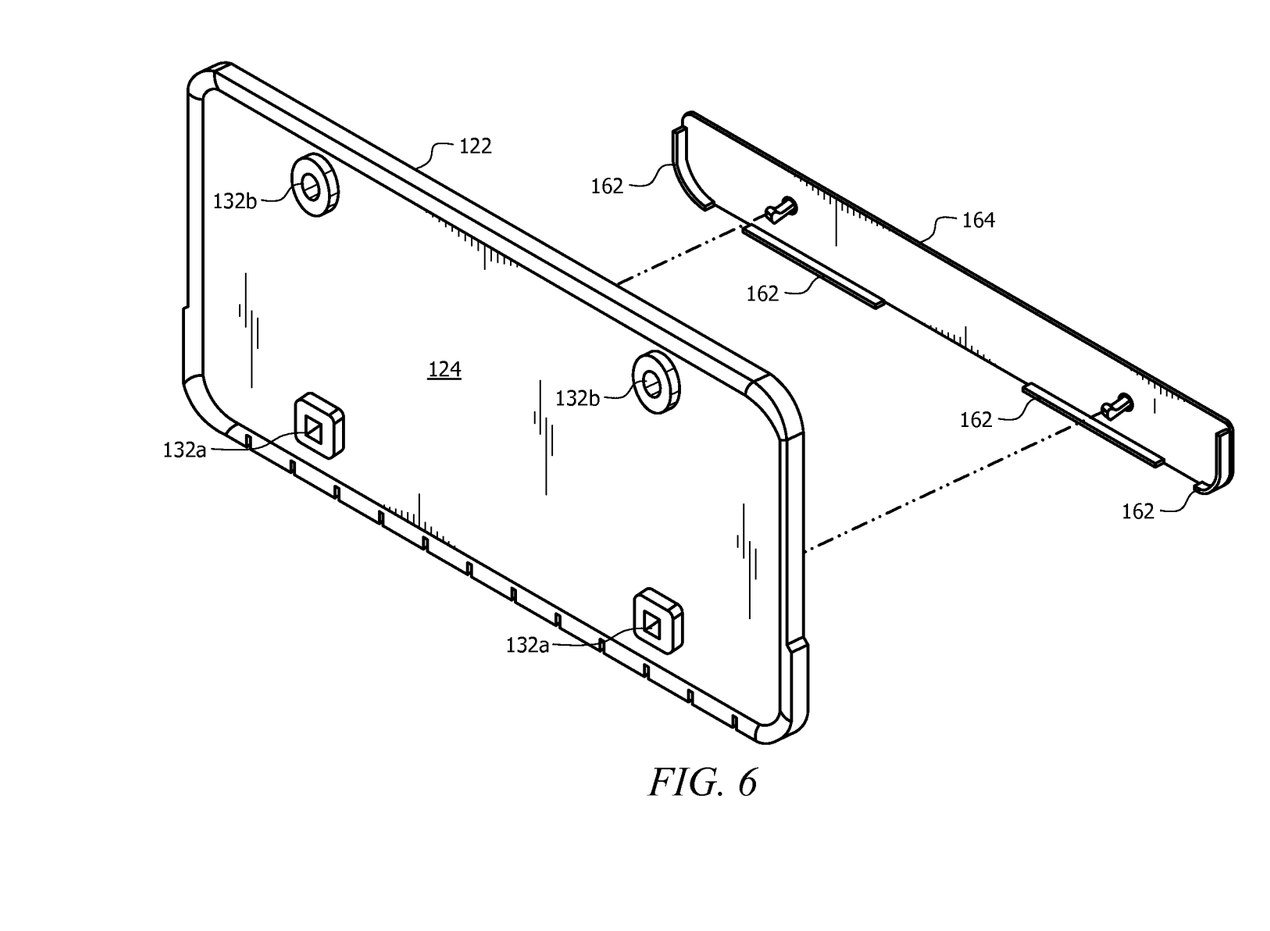
FIG. 6 is an illustration of the tabs on the backside of advertising band 164 as depicted in FIG. 1 according to an embodiment of the present disclosure.

In operation, the user may remove advertising band 164, as shown in FIG. 2, from frame 120 of system 100, which may be secured to a vehicle, as shown in FIG. 6. The user next may remove, insert or replace tag 200 within the frame 120, as shown in FIG. 2.

Figure 4:
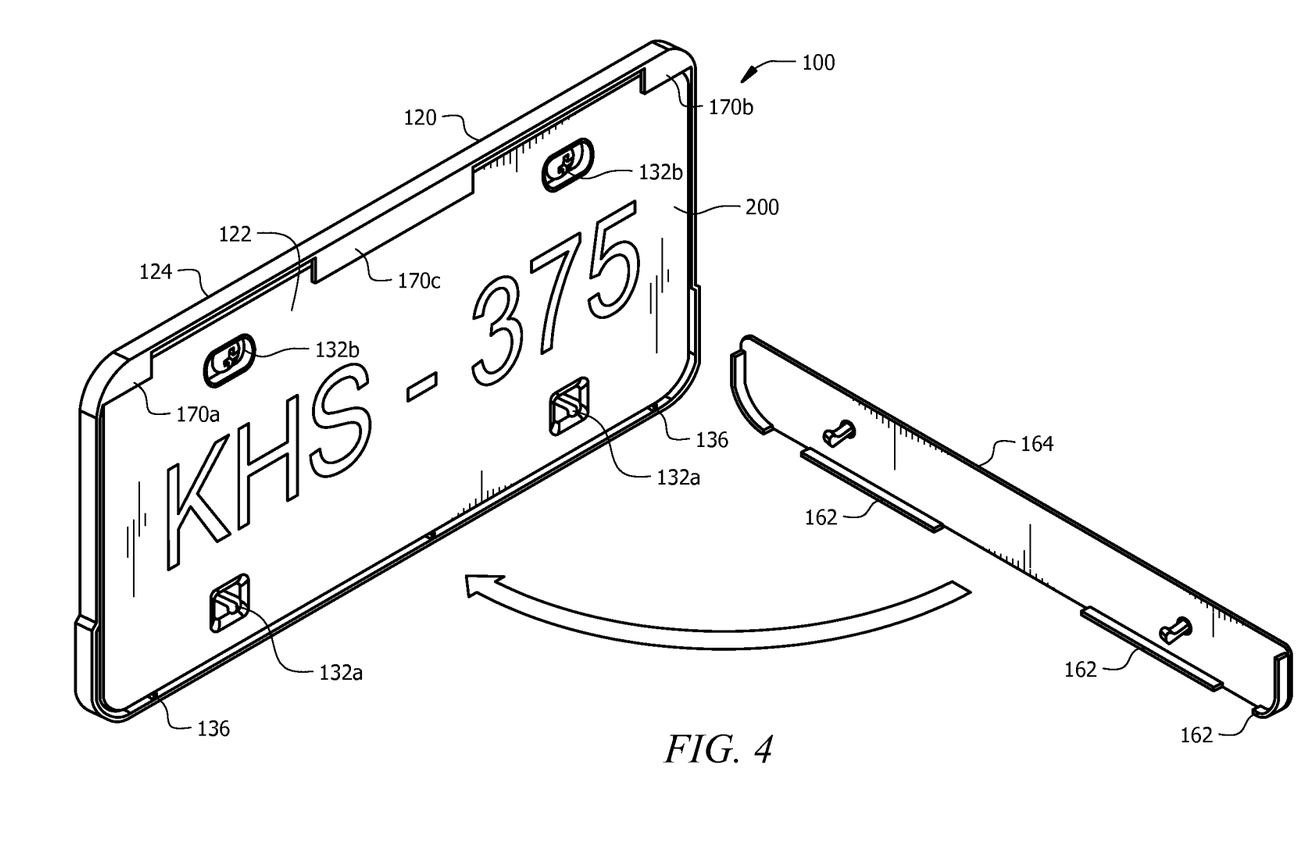
FIG. 4 is an exploded view of the locking mechanism of the license plate holder system of FIG. 1 in accordance with one embodiment of the present disclosure.
Figure 5:
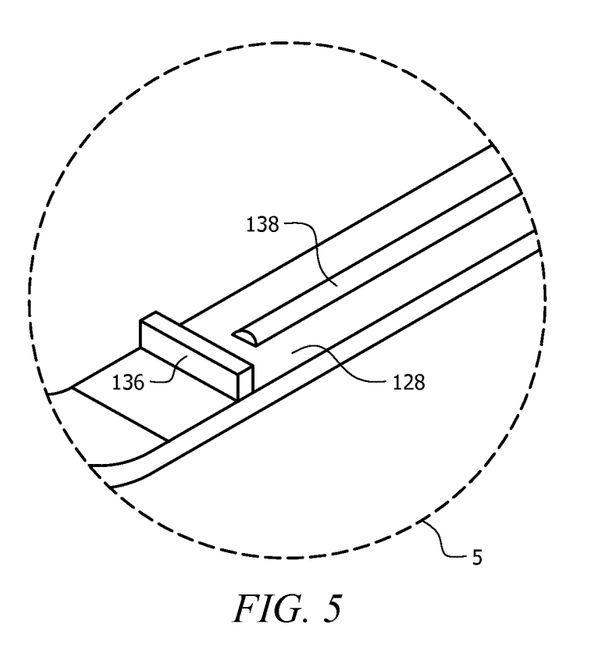
FIG. 5 is an enlarged illustration of the locking mechanism components of the license plate holder system of FIG. 4 in accordance with one embodiment of the present disclosure.

Spacer block 134 and grooves 136 may assist the user in guiding and retaining tag 200 in place within system 100, as shown in FIGS. 4 and 5. FIG. 5 is an enlarged view of locking mechanism components 5 of FIG. 4. Grooves 136 may lift tag 200 to the proper elevation vertically, as shown in FIG. 5, while spacer block 134 may support tag 200 to the proper angle horizontally, as shown in FIG. 4.

Figure 3:
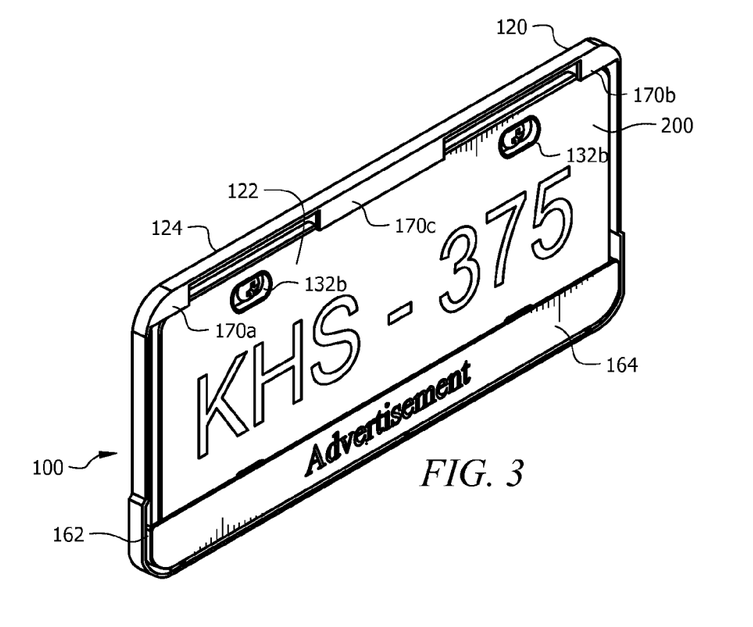
FIG. 3 is a collapsed perspective view of the license plate holder system of FIG. 1 in accordance with one embodiment of the present disclosure.

The user then may replace advertising band 164, locking system 100 in place, as shown in FIG. 3. In particular, when advertising band 164 is attached to the frame 120, the tabs 162 slide in between tag 200 and edge 124, securely encompassing tag 200. In such configuration, tabs 162 may align with friction bumps 138 of edge 124. When tabs 162 are disposed against friction bumps 138, the coefficient of friction and resulting increased traction locks system 100, thereby securing tag 200 within system 100.

It should be understood that the operational steps described herein are for illustrative purposes only and that any other suitable method or sub-method could be used in conjunction with or in lieu of the steps described herein according to one embodiment of the present disclosure. It should also be understood that the steps described herein could be performed in any suitable order or manner.

In one embodiment, the overall shape and configuration of system 100, as well as its method of locking may provide a license plate holder system that allows for the quick and convenient installation and removal of tag 200 without the use of tools. The locking mechanism, as well as the materials used in the construction of system 100 may provide a leak proof, water and moisture resistant seal to protect tag 200 from wear and distress caused by the elements, road debris, car washes, and other similar outside events, environmental effects or contaminants.

It should be appreciated that system 100, according to one embodiment of the present disclosure, may provide a multi-functional advertising medium. In an embodiment, when tag 200 is not required, or is not in use, advertising or other suitable indicia located on spacer block 134 may be visible. Advertising or other suitable indicia located on advertising band 164 may be seen independent of whether or not tag 200 is present. The advertising or other suitable indicia located on spacer block 134 may be different from or similar to the advertising or other suitable indicia located on advertising band 164.

It should be understood that system 100 according to embodiments of the present disclosure durable and may withstand, without chipping and with substantially little wear, the elements, road debris, car washes and other similar wearing events. Thus, system 100 according to embodiments of the present disclosure may be repeatedly used by a vehicle dealer on multiple vehicles, thereby reducing replacement costs and substantially reducing plastic waste. In other embodiments, system 100 may also be repeatedly used by a vehicle owner on the same or various vehicles, thereby also reducing replacement costs and substantially reducing plastic waste.

It should be appreciated that system 100 according to embodiments of the present disclosure may be employed and affixed to other objects, such as, for example, a door to a room. It also should be appreciated that system 100 according to embodiments of the present disclosure may be provided in any suitable size or shape depending on the desired purpose.

In one embodiment, any of back plate 122, edge 124, screws 130, tabs 132a, ports 132b, spacer block 134, grooves 136, friction bumps 138, tabs 162 and/or advertising band 164 may be made of ABS plastic, UV-resistant material, acrylic material, polycarbonate material, plastic, steel, stainless steel, aluminum, brass, bronze, light edge steel tubing, metal, wood, nylon, plastic, polyurethane, polyethylene, polyvinyl chloride (PVC), polytetrafluoroethylene (PTFE), polyester, high-gloss polyester, laminate, synthetic rubber, natural rubber, Plexiglas, polymer, glass, other suitable materials, or any combination thereof.

In an embodiment, back plate 122, edge 124, screws 130, ports 132b, spacer block 134, grooves 136, friction bumps 138, tabs 162 and/or advertising band 164 may include any number of suitable coatings and layers to substantially reduce scratching or injury to a vehicle, as well as to any surface engaged by system 100.

In one embodiment, the coatings and layers applied to back plate 122, edge 124, screws 130, tabs 132a, ports 132b, spacer block 134, grooves 136, friction bumps 138, tabs 162 and/or advertising band 164 may be made of ABS plastic, UV-resistant material, acrylic material, polycarbonate material, plastic, steel, stainless steel, aluminum, brass, bronze, light edge steel tubing, metal, wood, nylon, plastic, polyurethane, polyethylene, polyvinyl chloride (PVC), polytetrafluoroethylene (PTFE), polyester, high-gloss polyester, laminate, synthetic rubber, natural rubber, Plexiglas, polymer, glass, other suitable materials, or any combination thereof.

In one embodiment, any of grooves 136, friction bumps 138, tabs 132a and/or tabs 162 may be made of natural rubber, synthetic rubber, polymer, natural fiber, synthetic fiber, polyester, nylon, cotton, cotton mesh, vinyl, other suitable material, or any combination thereof.

In one embodiment, back plate 122, edge 124, spacer block 134, and/or advertising band 164 may be embellished with different colors, patterns, camouflage patterns, novelty items, ornamental items, stickers, removable stickers, paints, stencils, embossed, engraved, text, logos, designs, images, other decorative materials, or any combination thereof to enhance or otherwise achieve a desired design.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A license plate holder system comprising:
  a frame having a back plate and an edge extending around the perimeter of the back plate, the edge having a top portion opposite and parallel to a bottom portion and two side portions parallel to one another and connecting the top portion to the bottom portion;
  at least one frame tab disposed at the center of the top portion of the edge, wherein a license plate slides underneath the at least one frame tab to lock the license plate in place and secure it to the frame; and
  an advertising band removably attached to the bottom portion of the frame, the advertising band having at least one tab that slides in between the license plate and the edge to attach the advertising band to the frame,
  wherein the edge includes at least one friction bump that disposes against the at least one tab to provide increased traction and removably attach the advertising band to the frame, and
  wherein the license plate is removably secured to the frame and advertising band without the use of tools.

2. The system of claim 1, wherein the edge further comprises grooves to elevate and align the license plate.

3. The system of claim 1, the at least one frame tab further comprising: two top side frame tabs.

4. The system of claim 1, the frame further comprising: at least one port that receives a fastener to secure the back plate to a vehicle.

5. A self-locking license plate holding system comprising:
  a frame having an edge extending around the perimeter of the frame, the edge having a top portion opposite and parallel to a bottom portion and two side portions parallel to one another and connecting the top portion to the bottom portion, and a plurality of tabs disposed along the top portion to receive a license plate, wherein the license plate slides underneath the plurality of tabs to lock the license plate in place and secure it to the frame;
  an advertising band removably attachable to the bottom portion, the advertising band having a first surface and a second surface;
  at least two tabs extending perpendicularly from the first surface to removably attach the advertising band to the bottom portion; and
  advertising indicia disposed on the second surface,
  wherein the license plate is removably secured between the advertising band and the frame with the plurality of tabs on the frame and the at least two tabs on the advertising band and no tools are used to secure the license plate.

6. The system of claim 5, wherein the edge further comprises grooves.

7. The system of claim 5, the edge further comprising: a manipulation mechanism to detach the advertising band from the frame.

8. The system of claim 7, wherein the manipulation mechanism is selected from the group comprising:
  indention, clip, clasp, hook and plug.

9. The system of claim 5 wherein the edge includes at least one friction bump that disposes against the at least two tabs of the advertising band to provide increased traction and removably attach the advertising band to the frame.

* * * * *